Patented July 14, 1925.

1,546,237

UNITED STATES PATENT OFFICE.

PETER MÖLLER HEYERDAHL, OF BESTUM, NEAR CHRISTIANIA, NORWAY.

PROCESS FOR TREATING FATS WITH INDIFFERENT GASES TO MAKE THE FATS KEEPING.

No Drawing.   Application filed November 21, 1923. Serial No. 676,180.

*To all whom it may concern:*

Be it known that I, PETER MÖLLER HEYERDAHL, engineer, a subject of the King of Norway, residing at Bestum, near Christiania, Norway, have invented certain new and useful Improvements in Processes for Treating Fats with Indifferent Gases to Make the Fats Keeping; and I do hereby declare the following to be a full, clear, and exact description of the invention, such as will enable others skilled in the art to which it appertains to make and use the same.

Cod liver oil and other fats are when stored subject to chemical alterations whereby the flavor of the fats is injuriously affected.

Experience has shown that such undesirable alterations occur even when the fats are stored in closed vessels. It has been suggested to store the fats in an atmosphere of carbonic acid, nitrogen and other indifferent gas, but it has been impossible by these means to prevent deterioration by continued storage.

The socalled frothing oils produced by saturation of cod liver oil and other oils with carbonic acid and stored under pressure has also not proved to correspond to the expectations (Hefter: Technologie der Fette und Oele 1909, Bd. III, P. 6).

The reason while oils even when stored in carbonic acid or other indifferent atmosphere is become rancid according to what applicant has ascertained by his investigations apparently rests in the fact that oils always contain a small proportion of oxygen or air, which is not expelled even when the oils are saturated with carbonic acid by the methods hitherto employed in the production of frothing oils.

In accordance with this observation the present invention consists in subjecting the oils to a treatment which secures a complete expulsion of the dissolved air and substitution of the same by an indifferent gas. For this purpose the oil while being agitated is maintained in contact with an indifferent gas for some time, whereupon the excess of indifferent gas, which by this treatment has been taken up in the oil, is permitted to escape entirely or in part.

Before subjecting the oil to the said treatment with indifferent gas it is usually of advantage to place the oil under a vacuum until it has given off a substantial proportion of the oxygen contained therein. Carbonic acid or nitrogen is thereupon blown through the oil for such period of time as to result in expulsion of the remaining proportion of oxygen and substitution of the same by carbonic acid or nitrogen respectively. The oil is thereupon tapped into vessels for storage. These vessels are suitably hermetically sealed when the excess of indifferent gas, which has been taken up by the oil, is escaped.

Instead of passing the gas through the oil, the oil may be blown in fine jets one or more times through a space containing an indifferent gas. In this space the gas may be maintained under an atmospheric pressure but it is preferred to operate with a gas under a high pressure whether the gas is made use of in the one manner or the other.

During the treatment the temperature should be maintained below that at which the oil in question is known to be subject to undesirable changes. Usually it will be of advantage to operate at ordinary room temperature or at somewhat lower temperatures.

It has been found by experiments that fats which have been subjected to the above described treatment are in possession of very good keeping qualities.

Claims.

1. A process of treating liquid fats with indifferent gases in which the liquid fat is blown in fine jets through a space containing an indifferent gas until the oil has absorbed the indifferent gas.

2. A process of treating oils with indifferent gases in which the oil at a temperature near ordinary room temperature is blown in fine jets through a space containing an indifferent gas until the oil has absorbed said gas.

In testimony that I claim the foregoing as my invention, I have signed my name in presence of two subscribing witnesses.

PETER MÖLLER HEYERDAHL.

Witnesses:
  MOGENS BREGRE,
  OLGA MÜLLER.